US012512081B2

(12) United States Patent
Lee et al.

(10) Patent No.: US 12,512,081 B2
(45) Date of Patent: Dec. 30, 2025

(54) DISPLAY APPARATUS AND CONTROL METHOD THEREOF

(71) Applicant: SAMSUNG ELECTRONICS CO., LTD., Suwon-si (KR)

(72) Inventors: Youngho Lee, Suwon-si (KR); Jongchul Shin, Suwon-si (KR); Minhoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 18/298,608

(22) Filed: Apr. 11, 2023

(65) Prior Publication Data

US 2023/0245633 A1 Aug. 3, 2023

Related U.S. Application Data

(63) Continuation of application No. PCT/KR2021/013624, filed on Oct. 5, 2021.

(30) Foreign Application Priority Data

Oct. 12, 2020 (KR) ........................ 10-2020-0131461

(51) Int. Cl.
*G09G 5/22* (2006.01)

(52) U.S. Cl.
CPC ......... *G09G 5/227* (2013.01); *G09G 2310/08* (2013.01); *G09G 2340/0435* (2013.01)

(58) Field of Classification Search
CPC ............... G09G 5/227; G09G 2310/08; G09G 2340/0435; G09G 3/20; G09G 3/3648; G09G 2340/0407

(Continued)

(56) References Cited

U.S. PATENT DOCUMENTS

| | | | | |
|---|---|---|---|---|
| 7,387,392 B2 * | 6/2008 | Widdowson | H04N 9/3147 353/121 |
| 8,102,351 B2 * | 1/2012 | Tang | G09G 3/2055 345/694 |

(Continued)

FOREIGN PATENT DOCUMENTS

| | | |
|---|---|---|
| JP | 2014236241 A | 12/2014 |
| KR | 20060047359 A | 5/2006 |

(Continued)

OTHER PUBLICATIONS

Korean Office Action issued Jul. 23, 2024 in corresponding Korean Patent Application No. 10-2020-0131461.

(Continued)

*Primary Examiner* — Sheree N Brown
(74) *Attorney, Agent, or Firm* — Nixon & Vanderhye, P.C.

(57) ABSTRACT

A display apparatus is disclosed. The display apparatus comprises: a display panel which can output a first resolution content at a first frame rate; a communication interface comprising communication circuitry; and a processor which when a first resolution content is received through the communication interface and the frame rate of the content is the first frame rate, is configured to: adjust the resolution of the received content to a second resolution, generate an interpolated frame for the second resolution content, and control the display panel to output the second resolution content including the interpolated frame at a second frame rate greater than the first frame rate.

16 Claims, 20 Drawing Sheets

(58) Field of Classification Search
USPC .......................................................... 345/660
See application file for complete search history.

(56) References Cited

U.S. PATENT DOCUMENTS

| | | | | |
|---|---|---|---|---|
| 9,204,137 | B2 | 12/2015 | Kim et al. | |
| 9,396,689 | B2 * | 7/2016 | Liu | G09G 3/3614 |
| 9,514,703 | B2 | 12/2016 | Kim et al. | |
| 9,858,883 | B2 | 1/2018 | Jeong | |
| 10,438,522 | B2 | 10/2019 | Hur et al. | |
| 10,529,272 | B2 | 1/2020 | Kim et al. | |
| 10,699,384 | B2 | 6/2020 | Choi | |
| 2001/0048435 | A1 * | 12/2001 | Deering | G06T 15/04 345/428 |
| 2005/0012738 | A1 * | 1/2005 | Gong | G09G 5/006 345/212 |
| 2011/0115998 | A1 * | 5/2011 | Liao | G09G 3/3648 349/48 |
| 2011/0310096 | A1 | 12/2011 | Kim et al. | |
| 2012/0098864 | A1 * | 4/2012 | Chowdhry | G09G 5/397 345/660 |
| 2013/0155066 | A1 * | 6/2013 | McKenzie | G06T 15/06 345/660 |
| 2015/0145751 | A1 * | 5/2015 | Momonoi | G02B 3/0006 359/619 |
| 2016/0012765 | A1 | 1/2016 | Jeong | |
| 2016/0063946 | A1 | 3/2016 | Kim et al. | |
| 2016/0063965 | A1 | 3/2016 | Yoo | |
| 2016/0180789 | A1 | 6/2016 | Hur et al. | |
| 2017/0295325 | A1 * | 10/2017 | Yoon | H04N 5/265 |
| 2018/0144448 | A1 | 5/2018 | Choi | |
| 2019/0043413 | A1 | 2/2019 | Kim et al. | |
| 2021/0343228 | A1 | 11/2021 | Lee | |

FOREIGN PATENT DOCUMENTS

| | | | | |
|---|---|---|---|---|
| KR | 20070084932 | A | 8/2007 | |
| KR | 20080048655 | A | 6/2008 | |
| KR | 100934093 | B1 | 12/2009 | |
| KR | 101434312 | B1 | 8/2014 | |
| KR | 20160008384 | A | 1/2016 | |
| KR | 20160025143 | A | 3/2016 | |
| KR | 10-2016-0076207 | | 6/2016 | |
| KR | 101747717 | B1 | 6/2017 | |
| KR | 20180002092 | A | 1/2018 | |
| KR | 10-2018-0056268 | | 5/2018 | |
| KR | 20190014302 | A | 2/2019 | |
| KR | 20190076177 | A | 7/2019 | |
| KR | 20210133794 | A | 11/2021 | |
| WO | WO-2020105753 | A1 * | 5/2020 | H04N 7/0135 |

OTHER PUBLICATIONS

International Search Report for PC/KR2021/013624, mailed Jan. 14, 2022, 4 pages.
Written Opinion of the ISA for PCT/KR2021/013624, mailed Jan. 14, 2022, 4 pages.
Korean Office Action issued Nov. 1, 2023 in corresponding Korean Patent Application No. 10-2020-0131461.

* cited by examiner

DISPLAY APPARATUS AND CONTROL METHOD THEREOF

CROSS-REFERENCE TO RELATED APPLICATIONS

This application is a continuation of International Application No. PCT/KR2021/013624 designating the United States, filed on Oct. 5, 2021, in the Korean Intellectual Property Receiving Office and claiming priority to Korean Patent Application No. 10-2020-0131461, filed on Oct. 12, 2020, in the Korean Intellectual Property Office, the disclosures of which are incorporated by reference herein in their entireties.

BACKGROUND

Field

The disclosure relates to a display apparatus and a control method thereof and, for example, to a display apparatus for changing a frame rate and a control method thereof.

Description of Related Art

Recently, along with the development of technology for a display apparatus, a high-quality content having a frame rate of 120 Hz or more is also produced.

The operating frequency of most display apparatuses is 60 Hz, and a plurality of contents are manufactured at a frame rate of 60 Hz. Content of 60 Hz frequency has a problem that a blurring area and a judder are greatly generated with respect to high-quality content so that a user may feel inconvenience while watching the content.

If an interpolation image is produced to improve the frame rate of the content, some frames may be omitted as the operating frequencies of most display apparatuses correspond to 60 Hz. The hardware specification of the display apparatus may be improved such that content having a frame rate of 120 Hz or more may be smoothly reproduced without omitting a frame, but such a method has a problem that manufacturing costs are excessively increased.

There is a need of developing an apparatus and a method for providing high quality content while saving a manufacturing cost of a display apparatus.

SUMMARY

Embodiments of the disclosure provide a display apparatus for outputting an image by changing a frame rate of a display panel and a control method thereof according to the necessity described above.

A display apparatus according to an example embodiment includes: a display panel capable of outputting a first resolution content at a first frame rate; a communication interface comprising communication circuitry; and a processor configured, based on the first resolution content being received through the communication interface and the frame rate of the content being the first frame rate, to: adjust the resolution of the received content to a second resolution, generate an interpolated frame for the second resolution content, and control the display panel to output the second resolution content comprising the interpolated frame at a second frame rate greater than the first frame rate.

The display panel may include a plurality of pixel lines, and the processor may be configured to control the display panel to output the second resolution content comprising the interpolated frame at the second frame rate by providing a same data to at least two adjacent pixel lines among the plurality of pixel lines.

The number of plurality of pixel lines may correspond to a number of pixels arranged in a vertical direction among a plurality of pixels included in the display panel.

The display panel may include: a plurality of gate lines, a plurality of data lines, and a timing controller comprising circuitry, and the processor may be configured to: select two adjacent gate lines among the plurality of gate lines, and control the timing controller to provide the same data to the two gate lines through the plurality of data lines.

The horizontal resolution of the second resolution may be the same as horizontal resolution of the first resolution, and vertical resolution of the second resolution may correspond to a bisected value of vertical resolution of the first resolution.

The first frame rate may correspond to a bisected value of the second frame rate.

The processor may, based on the display apparatus being driven in a first mode, be configured to: control the display panel to output the first resolution content at the first frame rate, and based on the display apparatus being driven in a second mode, control the display panel to output the second resolution content at the second frame rate greater than the first frame rate. The processor may be configured to operate the display apparatus in any one of the first mode or the second mode based on receiving an input.

The processor may, based on the content being a first type, be configured to: operate the display apparatus in the first mode, and based on the content being a second type, operate the display apparatus in the second mode.

The processor may be configured to: generate the interpolated frame based on motion information of objects included in each of at least two temporally consecutive frames, among a plurality of frames comprising the second resolution content.

The processor includes: a frame rate conversion (FRC) unit comprising circuitry (e.g., frame rate conversion circuitry), and the FRC unit may be configured to: generate the content of the second frame rate and the second resolution including the interpolated frame by generating the interpolated frame with respect to the content of the first frame rate and the second resolution. According to an example embodiment, a method of controlling a display apparatus comprising a display panel capable of outputting a first resolution content at a first frame rate includes: receiving first resolution content; based on a frame rate of the received content being the first frame rate, adjusting the resolution of the received content to a second resolution; generating an interpolated frame for the second resolution content; and controlling the display panel to output the second resolution content comprising the interpolated frame at a second frame rate greater than the first frame rate.

The display panel may include a plurality of pixel lines, and the controlling the display panel may include: controlling the display panel to output the second resolution content comprising the interpolated frame at the second frame rate by providing a same data to at least two adjacent pixel lines among the plurality of pixel lines.

The number of plurality of pixel lines may correspond to a number of pixels arranged in a vertical direction among a plurality of pixels included in the display panel.

The display panel comprises a plurality of gate lines, a plurality of data lines, and a timing controller, and the controlling the display panel may include: selecting two adjacent gate lines among the plurality of gate lines; and controlling the timing controller to provide the same data to the two gate lines through the plurality of data lines.

The horizontal resolution of the second resolution may be the same as horizontal resolution of the first resolution, and vertical resolution of the second resolution may correspond to a bisected value of vertical resolution of the first resolution.

The first frame rate may correspond to a bisected value of the second frame rate.

The controlling the display panel may, based on the display apparatus being driven in a first mode, include: controlling the display panel to output the first resolution content at the first frame rate, and based on the display apparatus being driven in a second mode, controlling the display panel to output the second resolution content at the second frame rate greater than the first frame rate.

The controlling the display panel may include operating the display apparatus in any one of the first mode or the second mode based on a received input.

The controlling the display panel may, based on the content being a first type, include operating the display apparatus in the first mode, and based on the content being a second type, operating the display apparatus in the second mode.

The generating the interpolated frame may include: generating the interpolated frame based on motion information of objects included in each of at least two temporally consecutive frames, among a plurality of frames comprising the second resolution content.

As described above, according to various example embodiments of the disclosure as described above, the display panel may be driven at a plurality of frame rates without changing the panel structure of the display apparatus.

According to various example embodiments, a frame content of content may be improved to minimize and/or reduce generation of a blurring area and judder.

According to various example embodiments of the disclosure, a frame rate of content may be improved to provide a seamless and smooth image to a user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
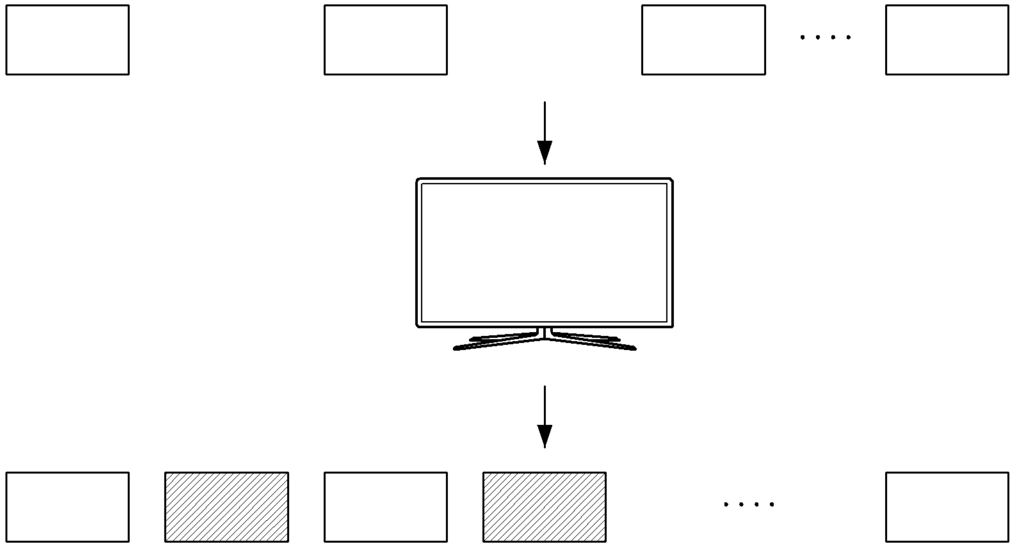
FIG. 1 is a diagram illustrating an example display apparatus according to various embodiments.

The disclosure will be described in greater detail below with reference to the drawings. General terms that are currently widely used were selected as terms used in embodiments of the disclosure in consideration of functions in the disclosure, but may be changed depending on the intention of those skilled in the art or a judicial precedent, the emergence of a new technique, and the like. In addition, terms may be arbitrarily chosen. In this case, the meaning of such terms will be mentioned in detail in a corresponding description portion of the disclosure. Therefore, the terms used in embodiments of the disclosure should be defined based on the meaning of the terms and the contents throughout the disclosure rather than simple names of the terms.

In this disclosure, the expressions "have," "may have," "include," or "may include" or the like represent presence of a corresponding feature (for example: components such as numbers, functions, operations, or parts) and does not exclude the presence of additional feature. The expression "At least one of A or/and B" should be understood to represent "A" or "B" or any one of "A and B".

As used herein, the terms "first," "second," or the like may denote various components, regardless of order and/or importance, and may be used to distinguish one component from another, and does not limit the components.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof. The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

In this disclosure, the term user may refer to a person using an electronic device or a device using an electronic device (e.g., an artificial intelligence electronic device).

Hereinafter, various example embodiments of the disclosure will be described in greater detail with reference to the accompanying drawings.

FIG. 1 is a diagram illustrating an example display apparatus according to various embodiments.

Referring to FIG. 1, the display electronic apparatus 100 according to an embodiment may display content of a plurality of frames. The display apparatus 100 may be implemented as a television (TV), but may be implemented as device equipped with a display function such as a video wall, a large format display (LFD), a digital signage, a digital information display (DID), a projector display, or the like. The electronic apparatus 100 may be a system itself or a virtual system in which a cloud computing environment is established. The display apparatus 100 may be implemented as a display of various types such as, for example, and without limitation, a liquid crystal display (LCD), organic light emitting diodes (OLED) display, liquid crystal on silicon (LCoS), digital light processing (DLP), quantum dot (QD) display panel, quantum dot light-emitting diodes (QLED), micro LED, mini LED, or the like. The display apparatus 100 may be implemented as a touch screen coupled to a touch sensor, a flexible display, a rollable display, a third-dimensional (3D) display, a display in which a plurality of display modules are physically connected, or the like.

For example, the display apparatus 100 according to an embodiment of the disclosure may be selectively driven in any one of a plurality of frame rates. Here, the frame rate may refer, for example, to a time and speed for the display apparatus 100 to display one frame. For example, when the frame rate of the display apparatus 100 is 60 Hz, the display apparatus 100 may scan the entire display area for 1/60s and may display one frame. The frame rate may be called a refresh rate, a driving frequency, or a scanning rate, but the term will be referred to as a frame rate for convenience of description. A frame rate of the display panel 110 may be expressed in units of Hz. For example, if the frame rate of the display panel 110 is 60 Hz, the display panel 100 may provide 60 frames per second. As another example, if the frame rate of the display panel 110 is 120 Hz, the display panel 100 may provide 120 frames per second. An example in which the frame rate of the display panel 110 is driven at 60 Hz and 120 Hz is merely an example, and the embodiment is not limited thereto. For example, the display panel 110 may be driven at various frame rates such as 75 Hz, 144 Hz, and 240 Hz.

According to an embodiment of the disclosure, when the frame rate of the display apparatus 100, that is, the operating frequency is the same as the frame rate of the content, the display apparatus 100 may display some of the plurality of frames of the content without omitting some of the plurality of frames.

If the frame rate of the display apparatus 100 and the frame rate of the content are the same according to an embodiment of the disclosure, the display apparatus 100 may generate an interpolated frame based on a plurality of frames of the content. The display apparatus 100 may display content including a plurality of frames and an interpolated frame.

For example, the display apparatus 100 may generate and add an interpolated frame between one preceding frame and one subsequent frame according to a time order among a plurality of frames. The frame rate of the content including both the plurality of frames of the content and the interpolated frame generated by the display apparatus 100 is relatively higher than the frame rate of the display apparatus 100. For example, the content including a plurality of frames may have a frame rate of 60 Hz, and the content including both the plurality of frames and the interpolated frame may have a frame rate of 120 Hz.

In the related art, when the frame rate of the content is relatively higher than the frame rate of the display apparatus, the related-art display apparatus may display the content while omitting some frames. In this case, there is a problem that the content is not smoothly reproduced. As an example method for addressing such a problem, there may be a method of improving the hardware specification of a display apparatus. However, in order to display content having a high frame rate, for example, a content having a frame rate of 120 Hz without omission of a frame, there is a problem in that manufacturing costs are increased.

Hereinbelow, a method of displaying content with a high frame rate by the display apparatus 100 without omission of a frame is disclosed.

Figure 2:
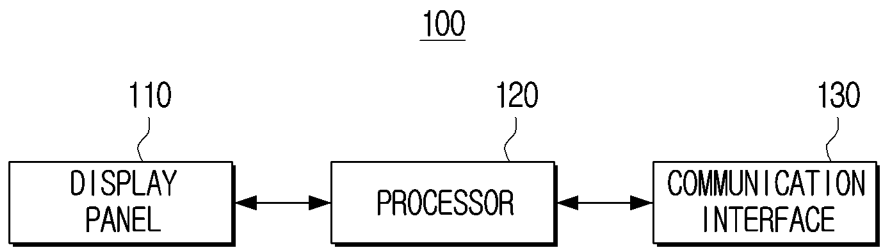
FIG. 2 is a block diagram illustrating an example configuration of the display apparatus according to various embodiments.

FIG. 2 is a block diagram illustrating an example configuration of the display apparatus according to various embodiments.

Referring to FIG. 2, the display apparatus 100 according to an embodiment includes a display panel 110, a processor (e.g., including processing circuitry) 120, and a communication interface (e.g., including communication circuitry) 130.

The display panel 110 includes a plurality of pixels and may display an image signal. For example, when the display panel 110 is implemented with 8K resolution, the display panel 110 may include a plurality of pixels of 7680×4320. As another example, when the display panel 110 is implemented with 4K resolution, the display panel 110 may include a plurality of pixels of 3840×2160. However, the embodiment is not limited thereto, and the display panel 110 may be implemented at various resolutions without being limited thereto, and the horizontal and vertical ratios of the display panel 110 may also be changed.

Each of the plurality of pixels included in the display panel 110 according to an embodiment may include subpixels representing red (R), green (G), and blue (B). As another example, a pixel may comprise subpixels representing W in addition to RGB. However, the embodiment is not limited thereto, and each of the plurality of pixels may be implemented in various forms. The display panel 110 according to an embodiment of the disclosure may include a plurality of gate lines and a plurality of data lines. The gate line is a line for transmitting a scan signal or a gate signal, and the data line is a line for transmitting a data voltage. For example, each of the plurality of sub-pixels included in the display panel 110 may be connected to one gate line and one data line. Each of the plurality of data lines may provide data to each of the pixels in the same column. The display panel 110 may, for example, be a panel having a 1 D1G stripe structure.

The display panel 110 may sequentially drive a plurality of gate lines or may simultaneously drive some of the plurality of gate lines. The display panel 110 according to an embodiment may simultaneously drive two adjacent gate lines among a plurality of gate lines. Various embodiments of the disclosure may be implemented in various types of display panels 110 having a driving structure capable of simultaneously driving a plurality of gate lines.

The display panel 110 according to an embodiment of the disclosure may output content of a first resolution at a first frame rate. For example, the display panel 110 may sequentially output a plurality of frames of content of a first resolution at a first frame rate.

For example, the display panel 110 may output content of 7680*4320 resolution at a frame rate of 60 Hz. A specific number is merely an example for convenience of description, but is not limited thereto. Hereinafter, for convenience of description, an operating frequency of the display panel 110 and a first frame rate are interchangeably described.

The display panel 110 according to an embodiment of the disclosure may be implemented to display one frame for a first time corresponding to a first frame rate. For example, the display panel 110 may display one frame for 1/60s. For example, when the display panel 110 is a 60 Hz panel having 7680×4320 resolution, the display panel 110 may display one frame having 7680×4320 resolution for 1/60s on the display panel 110 including 7680×4320 pixels, and when the display panel 110 is a 60 Hz panel having 3840×2160 resolution, the display panel 110 may display one frame having 3840×2160 resolution for 1/60s on a display panel including 3840×2160 pixels.

The first time may be a time taken for the entire plurality of gate lines included in the display panel 110 to be sequentially driven. For example, when the display panel 110 is a 60 Hz panel having 7680×4320 resolution, the display panel 110 may include a total of 4320 rows, and each row may include 7680 pixels. Here, the row may be referred to as a pixel line, and hereinafter, for convenience of description, a row or a pixel line will be used interchangeably. The display panel 110 according to an embodiment of the disclosure may drive a gate line corresponding to 7680 pixels included in a first row, and drive a gate line corresponding to 7680 pixels included in a second row sequentially, thereby driving up to a gate line corresponding to 7680 pixels included in a 4320$^{th}$ row.

The display panel 110 may display one frame through this operation, and the time for displaying one frame may refer, for example, to the time required to drive all gate lines corresponding to each of the first to 4320th rows (e.g., the last row).

However, the disclosure is not limited thereto, and the display panel 110 may drive a pixel included in a first row, and then drive a gate line corresponding to each row (for example, 4320 rows) of the display panel 110 in a manner of driving a pixel included in an arbitrary row other than the second, thereby displaying one frame. That is, the scan of the display panel 110 may be sequentially performed from the upper side to the lower side of the display panel, or any row may be scanned to finally scan all rows.

It has been described that the first frame rate is assumed to be 60 Hz so that the display panel 110 displays one frame for 1/60s. However, the embodiment is not limited thereto, and the time at which the display panel 110 displays one frame or the frame rate of the display panel 110 may be variously changed.

The display panel 110 may be implemented as various types of displays such as, for example, and without limitation, a liquid crystal display (LCD), organic light emitting diodes (OLED) display, a plasma display panel (PDP), micro LED, laser display, virtual reality (VR), glass, and the like. In the display panel 110, a driving circuit of the display panel may be implemented using one or more of an a-Si TFT, a low temperature poly silicon (LTPS) TFT, an organic TFT (OTFT), and a backlight. In the meantime, the display panel 110 may be implemented as a touch screen coupled with a touch sensor, a flexible display, a three-dimensional (3D) display, or the like.

The processor 120 may include various processing circuitry and controls the overall operation of the display apparatus 100. For example, the processor 120 may be connected to each component of the display apparatus 100 to control overall operation of the display apparatus 100. For example, the processor 120 may be connected to a configuration such as a display panel 110, a communication interface 130, a memory (not shown), and the like to control the operation of the display apparatus 100. The processor 120 may include an image processing unit (scaler, not shown) and a timing controller (not shown). However, the processor 120 may be implemented as a separate component, and in this case, the processor 120 may be connected to a configuration such as an image processing unit, a timing controller, or the like to control the operation of the display apparatus 100.

According to an embodiment, the processor 120 may be implemented with a digital signal processor (DSP), a microprocessor, and a time controller (TCON), but this is not limited thereto. The processor 120 may include, for example, and without limitation, one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 120 may be implemented in a system on chip (SoC) type or a large scale integration (LSI) type which a processing algorithm is built therein or in a field programmable gate array (FPGA) type.

The processor 120 according to an embodiment of the disclosure may adjust the received content to a second resolution when the content of the first resolution is received through the communication interface 130 and the frame rate of the content corresponds to the frame rate of the display panel 110. For example, if the frame rate of the display panel 110 and the frame rate of the received content are the same as the first frame rate, the processor 120 may adjust the content of the first resolution to the second resolution.

The processor 120 may generate an interpolated frame for the content of the second resolution. This is merely an example and the disclosure is not limited thereto.

In another example, when the frame rate of the display panel 110 and the frame rate of the received content are the same as the first frame rate, the processor 120 may generate an interpolated frame. The processor 120 may then adjust the resolution of the content including the interpolated frame from the first resolution to the second resolution.

The processor 120 may control the display panel 110 to output the content of the second resolution at the second frame rate greater than the first frame rate.

The processor 120 may control the display panel 110 such that one frame included in the content of the second resolution is smaller than the first time and is displayed for a second time corresponding to the second frame rate. Here, the first time may be 1/60s corresponding to 60 Hz, and the second time corresponding to the second frame rate may be 1/120s corresponding to 120 Hz. This is merely an example and is not limited thereto.

According to an embodiment, an operation of generating an interpolated frame by the processor 120 will be described in greater detail below.

The processor 120 according to an embodiment of the disclosure may generate an interpolated frame based on at least two frames among a plurality of frames of content. For example, the processor 120 may generate an interpolated frame based on motion information of an object included in each of at least two frames among a plurality of frames. The motion information may include a position of an object included in the frame, a shape of an object commonly included in the two frames, a position change amount, or a color, an illuminance change amount, and the like. Here, the at least two frames may be temporally consecutive frames.

The processor 120 according to an embodiment may generate a third frame as an interpolated frame based on motion information of each of a first frame and a second frame among a plurality of frames, and insert a third frame between the first and second frames. The second frame may be a frame that follows the first frame according to a time order. The first frame and the second frame may be temporally consecutive frames.

The method for generating the interpolated frame by the processor 120 according to an embodiment of the disclosure may include various methods such as frame rate doubling, motion estimation/motion compensation (MEMC), fluid motion of AMD, etc. in addition to the above-described method. According to an embodiment, the processor 120 may predict a motion of an object based on a path difference of a vector between the first and second frames, and generate an interpolated frame including an object based on the predicted movement. The step of predicting the movement of the object may be referred to as motion estimation (ME), and the step of generating the interpolated frame including the object may be referred to as motion compensation (MC).

The processor 120 according to an embodiment of the disclosure may control the display panel 110 to output the content of the second resolution including the interpolated frame at a second frame rate greater than the first frame rate. The display panel 110 may output the content of the second resolution as the second frame rate and the content of the first resolution under the control of the processor 120. This operation is possible as the display panel 110 repeatedly displays one pixel line included in the content of the second resolution through two adjacent gate lines among the plurality of gate lines.

In order to describe the above operation, the operation of adjusting the resolution by the processor 120 will be described in greater detail below.

The processor 120 may adjust the content to the second resolution based on the division value of the vertical resolution of the display panel 110. For example, if the display panel 110 is a panel of 7680×4320 resolution, the processor 120 may adjust the resolution of the content based on a division value of the vertical resolution 4320.

The division may refer, for example, to division into the same size, and the division value may refer, for example, to the size of each individual part according to the division. For example, a bisector value of 4320 may be 2160, and a value of quadrisection may be 1080. The vertical resolution of the display panel 110 refers to the number of pixels arranged in a vertical direction among a plurality of pixels included in the display panel 110.

The processor 120 may adjust the horizontal resolution of the content based on the horizontal resolution of the display panel 110, and adjust the vertical resolution of the content based on the division value of the vertical resolution of the display panel 110. For example, if the display panel 110 is a panel of 7680×4320 resolution, the processor 120 may adjust the horizontal resolution of the content based on the horizontal resolution 7680 and adjust the vertical resolution of the content based on a division value of the vertical resolution 4320, for example, 2160 which is a bisector value.

For example, the processor 120 may adjust the resolution of the content to 7680×2160 by adjusting the vertical resolution of the content if the display panel 110 is a panel of 7680×4320 resolution and the resolution of the content is 7680×4320. If the display panel 110 is a panel having a resolution of 7680×4320 and the resolution of the content is 3840×2160, the processor 120 may adjust the resolution of the content to 7680×2160 by adjusting the horizontal resolution of the content. The processor 120 may adjust at least one of the horizontal resolution or the vertical resolution of the content based on the division value of the horizontal resolution and of the vertical resolution of the display panel 110. Here, the resolution adjustment may be up-scaling or down-scaling. For example, if the display panel 110 is a panel having a resolution of 3840×2160 and the resolution of the content is 1920×1080, the resolution of the content may be adjusted to 3080×1080 by adjusting the vertical resolution of the content.

The processor 120 may control the display panel 110 such that one frame included in the content having adjusted resolution is displayed for a second time that is less than the first time. The first time may be a time taken for the entire plurality of gate lines included in the display panel 110 to be sequentially driven.

To describe a method of reducing the time at which one frame is displayed, an example of using the division value of the vertical resolution of the display panel 110 will be described in greater detail below.

The processor 120 may adjust the resolution of the content based on the bisector value of the vertical resolution of the display panel 110. For example, if the resolution of the display panel 110 is 7680×4320 and the resolution of the content is 7680×4320, the processor 120 may adjust the resolution of the content to 7680×2160 based on 2160, which is a bisector value of the vertical resolution of the display panel 110.

The processor 120 may control the display panel 110 so that one frame is displayed for two hours by driving adjacent two gate lines simultaneously among a plurality of gate lines included in the display panel 110.

For example, according to an embodiment, by sequentially driving a plurality of gate lines included in the display panel 110 one by one, the first time taken to drive the entire plurality of gate lines may be two times longer than the second time taken to drive the entire plurality of gate lines by driving two adjacent gate lines simultaneously among a plurality of gate lines.

According to an embodiment of the disclosure, the processor 120 may shorten the output time of each frame from a first time to a second time in order to provide both a plurality of frames included in the content and a newly added interpolated frame without omission, and may drive one pixel line included in the frame with the adjusted vertical resolution by driving two adjacent gate lines among the plurality of gate lines to reduce an output time.

For example, the display panel 110 may include a gate line of 4320, a vertical resolution of the content to be displayed may be 2160, and the processor 120 may drive two gate lines on the upper end of the display panel 110 to display a first pixel line of the content. The processor 120 may drive two gate lines just below to display a second pixel line of the content. In this way, the processor 120 may sequentially display all pixel lines of the content.

In the related art, in order to display one frame, a plurality of gate lines should be sequentially driven by 4320 times or time divided into 4320 times, but in the case of the disclosure, two adjacent gate lines are driven at the same time, so the two adjacent gate lines are driven according to 2160 times or the time divided into 2160 times, and the time at which one frame is displayed may be reduced to half. The time for displaying one frame may be shortened by lowering the vertical resolution of the content. For example, even if the vertical resolution of the content is lowered to 2160, the resolution is significantly high resolution and thus, there is little deterioration in picture quality. That is, a viewer may not significantly recognize image quality deterioration.

The display panel 110 according to an embodiment may output the content of the first resolution at the first frame rate and may output the content of the second resolution at the second frame rate.

For example, if the second resolution is relatively smaller than the first resolution, the scanning time required to display each of the plurality of frames of the content of the second resolution is reduced relative to the scanning time required to display each of the plurality of frames of the content of the first resolution. Accordingly, the processor 120 may output a relatively large number of frames according to the reduction in the scanning time. For example, the processor 120 may output the content at a relatively large frame rate when outputting the content of the second resolution rather than when outputting the content of the first resolution.

Although it has been described that the bisector value of the vertical resolution is used, this is only an example. The division values may vary. The resolution of the content may be adjusted based on the resolution lower than the vertical resolution of the display panel 110 rather than the division value of the vertical resolution of the display panel 110. For example, when the display panel 110 includes a gate line of 4320, the processor 120 may adjust the vertical resolution of the content to 617 and simultaneously drive the seven consecutive gate lines. One gate line remains, and one pixel is very small without driving the gate line, so that the viewer is difficult to recognize it.

According to an embodiment of the disclosure, when the display panel 110 is a 60 Hz panel and the frame rate of the content is 120 Hz, the processor 120 may adjust the resolution of the content from the first resolution to the second resolution based on the bisector value of the vertical resolution of the display panel 110, and may control the display panel 110 to display one frame included in the content having the adjusted resolution for a second time (for example, 1/120 s) shorter than the first time (for example, 1/60 s).

The processor 120 may determine a division value of the vertical resolution of the content based on the number of interpolated frames to be newly generated and added. For example, the processor 120 may assume a case where the frame rate of the content is 60 Hz and the display panel 110 is a 60 Hz panel. When the processor 120 inserts three interpolated frames between each of the plurality of frames of the content, the content including both the plurality of frames and the interpolated frame may have increased number of total frames by four times. That is, the frame rate of the content becomes 240 Hz. In this case, the processor 120 may quadrisect the vertical resolution of the content. That is, when content having the same resolution as that of the display panel 110 is input, the processor 120 may, for example, i) down-scale the vertical resolution of the content to correspond to the bisector value of the vertical resolution of the display panel 110 when one interpolated frame is generated and inserted between the plurality of frames of the content, and for another example, ii) down-scale the vertical resolution of the content to correspond to a quadrisect value of the vertical resolution of the display panel 110 when three interpolated frames are generated and inserted between the plurality of frames of the content. This is merely an example, and the processor 120 may variously change the number of generated interpolated frames to add the interpolated frame between a plurality of frames according to user setting, content type, or the like.

For convenience of description, the content received through the communication interface 130 is collectively referred to as first content, and the content obtained by generating an interpolated frame between a plurality of frames of the first content is referred to as second content. According to an embodiment, the first content may be content of the first frame rate, for example, content including 60 frames for one second, and the second content may be content of the second frame rate, for example, content including 120 frames for one second. Here, 60 frames among the 120 frames may be interpolated frames.

In the related art display apparatus, if the display panel 110 is a 60 Hz panel, some of the frames of the content of 120 Hz are omitted to display one frame included in the content of 120 Hz for the first time, that is, 1/60*s*. In contrast, the processor 120 of the disclosure may adjust the resolution of the content of 120 Hz from the first resolution to the second resolution based on the bisector value of the vertical resolution of the display panel 110, and control the display panel 110 such that one frame included in the content of 120 Hz having the adjusted resolution is displayed for a second time, that is, 1/120*s*. In this case, the processor 120 may sequentially display two frames included in the content for a first time, that is, 1/60*s*, which may refer, for example, to all frames of the content of 120 Hz may be displayed without omission.

The communication interface 130 may include various communication circuitry and communicates with various types of external devices according to various types of communication methods. The communication interface 130 may, for example, and without limitation, include a Wi-Fi module, a Bluetooth module, an infrared communication module, a wireless communication module, and the like. Here, each communication module may be implemented in the form of at least one hardware chip.

The processor 120 may communicate with various external devices using the communication interface 130. The external device may include, for example, and without limitation, a server, a Bluetooth earphone, an electronic device, or the like.

The Wi-Fi module and the Bluetooth module perform communication using Wi-Fi method and Bluetooth method, respectively. When using the Wi-Fi module or the Bluetooth module, various connection information such as a service set identifier (SSID) and a session key may be transmitted and received first, and communication information may be transmitted after communication connection.

An infrared ray communication module performs communication according to infrared data association (IrDA) technology that transmits data wireless to local area using infrared ray between visible rays and millimeter waves.

The wireless communication module may refer, for example, to a module performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication standards described above.

The communication interface 130 may include at least one of a local area network (LAN) module, Ethernet module, or wired communication module performing communication using a pair cable, a coaxial cable, an optical cable, or the like.

The communication interface 130 may further include an input/output interface. The input and output interface may be at least one interface among, for example, and without limitation, high definition multimedia interface (HDMI), mobile high definition link (MHL), universal serial bus (USB), display port (DP), Thunderbolt, video graphics array (VGA) port, RGB port, d-subminiature (D-SUB), digital visual interface (DVI), and the like.

The input and output interface may input and output at least one of a voice signal and a video signal.

According to an embodiment, the input and output interface may include a port for inputting and outputting only a voice signal and a port for inputting and outputting only a video signal as separate ports, or may be implemented as one port for inputting and outputting both a voice signal and a video signal.

In FIG. 2, the processor 120 adjusts the resolution of the content and controls a plurality of gate lines included in the display panel 110. Although it has been described in FIG. 2 that the processor 120 includes a scaler for adjusting the resolution of content and a timing controller (TCON) for controlling a plurality of gate lines included in the display panel 110, the disclosure is not limited thereto, and various embodiments will be described in greater detail below with reference to FIG. 3.

Figure 3:
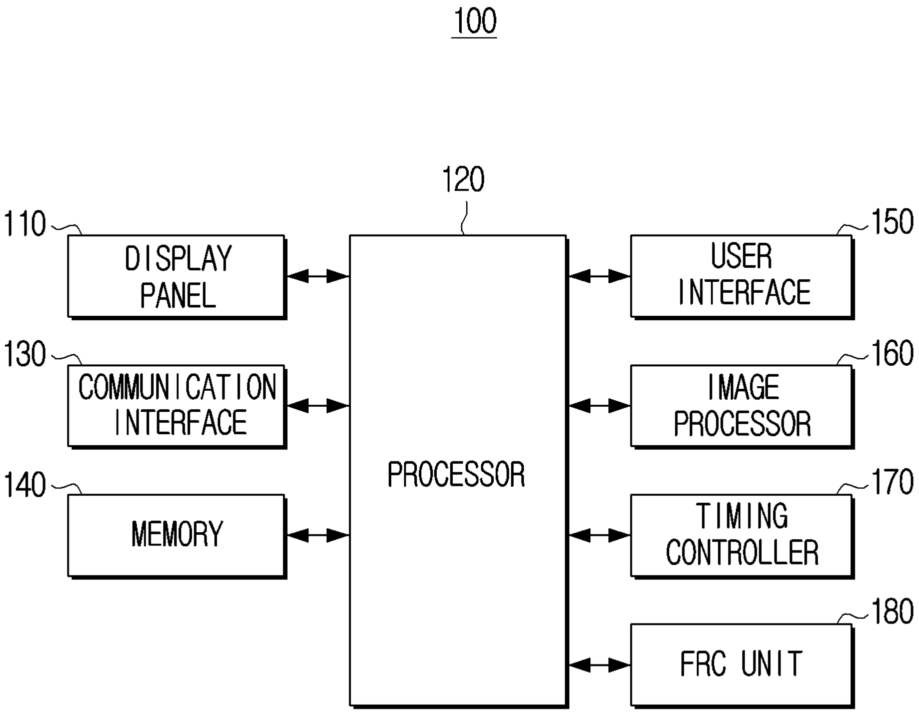
FIG. 3 is a block diagram illustrating a configuration of a display apparatus according to various embodiments.

FIG. 3 is a block diagram illustrating an example configuration of a display apparatus according to various embodiments.

According to FIG. 3, the display apparatus 100 may further include the display panel 110, the processor (e.g., including processing circuitry) 120, the communication interface (e.g., including communication circuitry) 130, a memory 140, a user interface (e.g., including user interface circuitry) 150, an image processor (e.g., a scaler) 160, a timing controller (TCON) 170, and a frame rate conversion (FRC) unit (e.g., including frame rate conversion circuitry) 180. A description of the same configuration as that of FIG. 2 of the configuration of FIG. 3 may not be repeated here.

The memory 140 may store content. The processor 120 may image-process the content stored in the memory 140 and display the image through the display panel 110. In addition, the memory 140 may store information for displaying other content.

The memory 140 may be implemented as a non-volatile memory, a volatile memory, or the like, but is not limited thereto. For example, a hard disk may be used instead of a memory or any configuration capable of storing data may be used.

The user interface 150 may include various user interface circuitry and receives various user interactions. The user interface 150 may be implemented in various forms according to an implementation example of the display apparatus 100. For example, the user interface 150 may be a button provided in the display apparatus 100, a microphone for receiving a user voice, a camera for detecting a user motion, and the like. Alternatively, when the display apparatus 100 is implemented as a touch-based terminal device, the user interface 150 may be implemented in the form of a touch screen forming a mutual layer structure with the touch pad. In this case, the user interface 150 may be one configuration of the display panel 110 described above. The image processor 160 may include various circuitry and adjust the resolution of the content under the control of the processor 120. For example, the image processor 160 may up-scale or down-scale content under the control of the processor 120. The image processor 160 may change the resolution ratio of the content. For example, the image processor 160 may adjust content having a resolution of 16:10 to content of 16:5.

The timing controller 170 may include various control circuitry and receive an input signal IS, a horizontal synchronization signal Hsync, a vertical synchronization signal Vsync, and a main clock signal MCLK from an external device, for example, the processor 120, and generate an image data signal, a scan control signal, a data control signal, a light emission control signal, and the like, and provide the image data signal, the scan control signal, the data control signal, the emission control signal, and the like to the display panel 110.

The communication interface 130, the memory 140, the user interface 150, the image processor 160, and the timing controller 170 may be implemented in one configuration, or only some components may be implemented in one configuration. In addition, at least one of the communication interface 130, the memory 140, the user interface 150, the image processor 160, or the timing controller 170 may be implemented in a form combined with the display panel 110.

The display apparatus 100 according to an embodiment of the disclosure may include a frame rate conversion (FRC) unit 180. Although FIG. 3 illustrates that the FRC unit 180 is a separate component distinguished from the processor 120 for convenience of description, the embodiment is not limited thereto, and the FRC unit 180 may also be implemented as the processor 120.

The FRC unit 180 may read a frame of a plurality of images having an input first frame rate into an FRC schedule and convert the frame into a second frame rate. The FRC schedule refers to a method of repeatedly reading each frame before a frame rate conversion by a predetermined number of times. For example, when eight frames are generated by converting a frame rate with four frames of 1-2-3-4, the frame rate may be converted by reading the frame rate from 1-1-2-2-3-3-4-4 according to the FRC schedule.

The FRC unit 180 may read frames of a plurality of images in various manners to mix the images converted at the second frame rate, respectively. For example, the FRC unit 180 may repeatedly read a frame to generate an image of a second frame rate twice as compared to the first frame rate.

As another example, the FRC unit 180 may generate an image of a second frame rate twice as compared to the first frame rate by generating the motion compensated interpolated frame. For example, the FRC unit 180 may obtain a motion vector by analyzing a difference between front and rear frames of an image. The FRC unit 180 may generate an interpolated frame using the extracted motion vector and insert the interpolated frame into an interpolated frame generated between some frames.

Through this, the FRC unit 180 may enable to output a softer image through motion compensation process.

The display apparatus 100 may be implemented in a form in which the display panel 110 includes a timing controller 170.

Figure 4:
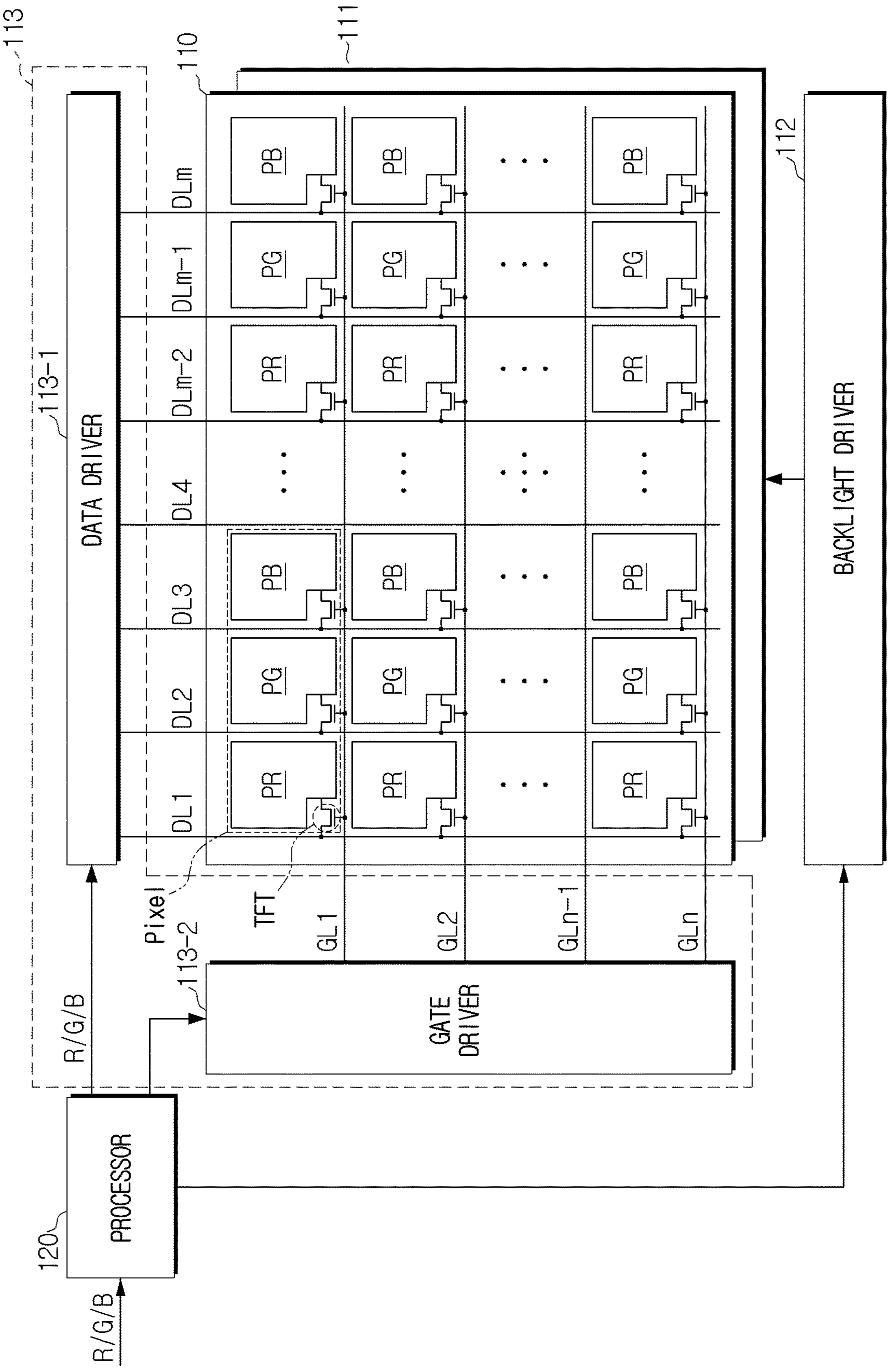
FIG. 4 is a diagram illustrating a structure of a display panel according to various embodiments.

FIG. 4 is a diagram illustrating an example structure of a display panel according to various embodiments.

The display panel 110 may be formed such that the gate lines GL1 to GLn and the data lines DL1 to DLm cross each other, and R, G, B sub-pixels PR, PG, PB are formed at the area provided by the cross. The adjacent R, G, B sub-pixels PR, PG, PB form one pixel. That is, each pixel may reproduce color of the subject with three primary colors of red R, green G, and blue B including R subpixel PR representing red R, G subpixel PG representing green G, and B subpixel PB representing blue B.

When the display panel 110 is implemented as an LCD panel, each subpixel PR, PG, and PB may include a pixel electrode and a common electrode, and the light transmittance is changed while the liquid crystal alignment is changed to the electric field formed with the potential difference between both electrodes. TFTs formed at a cross portion of gate lines (GL1 to GLn) and data lines (DL1 to DLm) may supply video data from data lines (DL1 to DLm), that is, R, G, and B data, to pixel electrodes of each subpixel PR, PG, and PB, in response to scan pulse from each gate line (GL1 to GLn).

The display panel 110 may further include a backlight unit 111, a backlight driver 112, and a panel driver 113.

The backlight driver 112 may be implemented as a type to include a driver IC to drive the backlight unit 111. According to one example, the driver IC may be implemented as the processor 130 and a separate hardware. For example, when the light sources included in the backlight unit 111 are implemented as LED elements, the driver IC may be implemented with at least one LED driver that controls the current applied to the LED element. According to an embodiment, the LED driver may be disposed at the rear end of a power supply (for example, a switching mode power supply (SMPS)) to receive a voltage from the power supply. However, according to an embodiment, a voltage may be applied from a separate power supply.

Alternatively, it is also possible that the SMPS and LED drivers are implemented in one integrated module form.

The panel driver 113 may be implemented as a type to include the driver IC for driving the display panel 110. According to an embodiment, the driver IC may be implemented as hardware separate from the processor 120. For example, the panel driver 113 may include the data driver 113-1 for supplying video data to data lines and the gate driver 113-2 for supplying the scan pulse to the gate lines.

The data driver 113-1 includes various circuitry for generating a data signal, and generates a data signal by receiving image data of R/G/B from the processor 120 (or timing controller 170). The data driver 113-1 may apply, to the display panel 110, the data signal that is generated through connection to the data lines (DL1, DL2, DL3, DLm) of the display panel 110. The data driver 113-2 (or scan driver) includes various circuitry for generating a gate signal (or a scan signal), which is connected to the gate lines (GL1, GL2, GL3, GLn) and transfers the gate signal to a specific row of the display panel 110. To a pixel to which the gate signal is transferred, a data signal output from the data driver 113-1 is transferred.

The processor 120 may control the gate driving unit 113-2 to simultaneously drive at least two gate lines. The processor 120 may control the display panel 110 by transmitting a signal to at least one of the data driver 113-1 or the gate driver 113-2. Through this operation, the display time of the frame may be shortened, and the content may be displayed at a frame rate higher than the operating frequency of the display panel 110.

The operation of the processor 120 will be described in greater detail below with reference to various drawings below. In the following drawings, each embodiment may be implemented individually or in a combined form.

Figure 5:
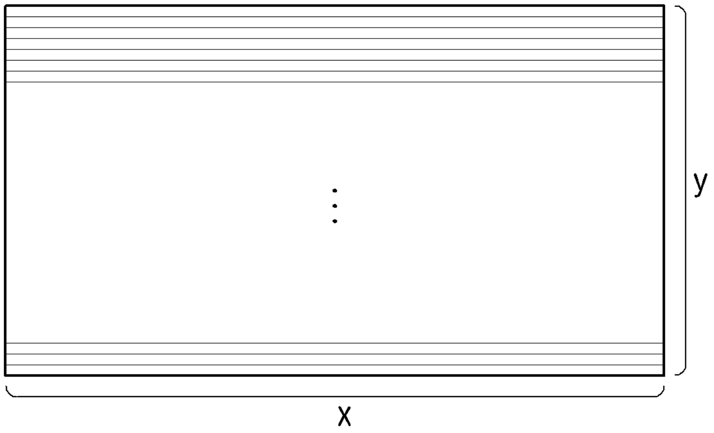
FIG. 5 is a diagram illustrating a method of driving a display panel according to various embodiments.

FIG. 5 is a diagram illustrating an example method of driving a display panel according to various embodiments.

The display panel 110 may be implemented as a panel having a resolution of x×y. For example, the display panel 110 may be implemented as a panel having a resolution of 7680×4320. Alternatively, the display panel 110 may be implemented as a panel having a resolution of 3840×2160. However, this is merely an example, and the display panel 110 may be implemented at different resolutions. The width to height ratios of the display panel 110 may be diverse like 21:9, 32:9, or the like.

In FIG. 5, a display panel 110 implemented as a panel having a resolution of x×y is illustrated, and for convenience of description, only a vertical resolution is displayed in a distinguished manner. That is, the display panel 110 implemented as a panel having a resolution of x×y may be divided into y regions having longer width.

According to an embodiment, y regions in which width is longer may be driven through one gate line. The display panel 110 may include y number of gate lines.

Figure 6:
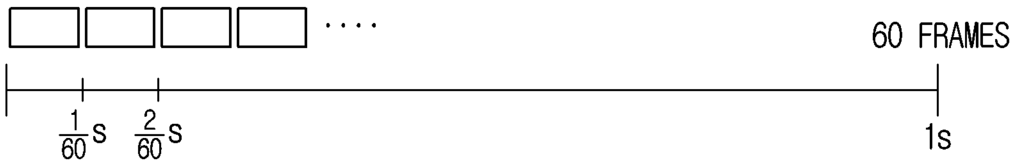
FIG. 6 is a diagram illustrating a frame various embodiments.

FIG. 6 is a diagram illustrating an example frame rate according to various embodiments.

In FIG. 6, the display panel 110 is 60 Hz for convenience of description.

As shown in FIG. 6, the display panel 110 may display 60 frames for one second. The display panel 110 may display one frame for 1/60s.

The display panel 110 may sequentially drive y number of gate lines to display one frame for 1/60 s. When the processor 120 drives one gate line at a time, a unit time in which one gate line is driven is 1/(60×y)s, and when all of the gate lines are driven y times, a time of 1/60s is taken. According to an embodiment of the disclosure, when the processor 120 simultaneously drives two gate lines, the number of repeated times to drive all of the gate lines is y/2, so that a total of 1/120s is taken.

Figure 7:
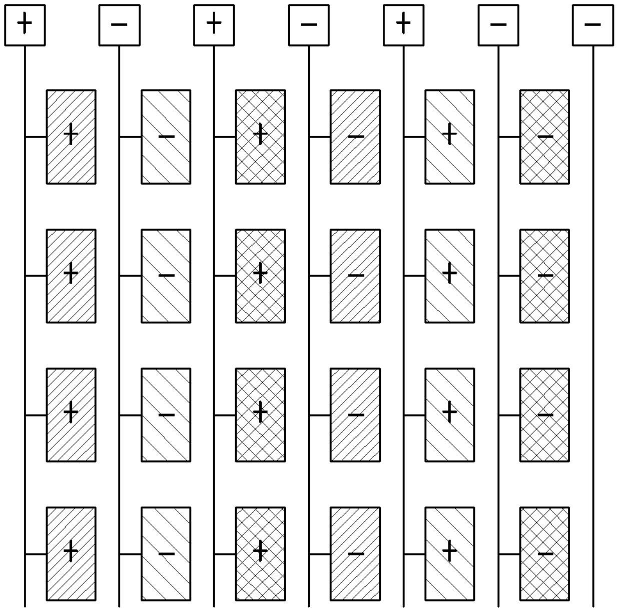
FIGS. 7, 8 and 9 are diagrams illustrating a method for driving a display panel according to various embodiments.
Figure 8:
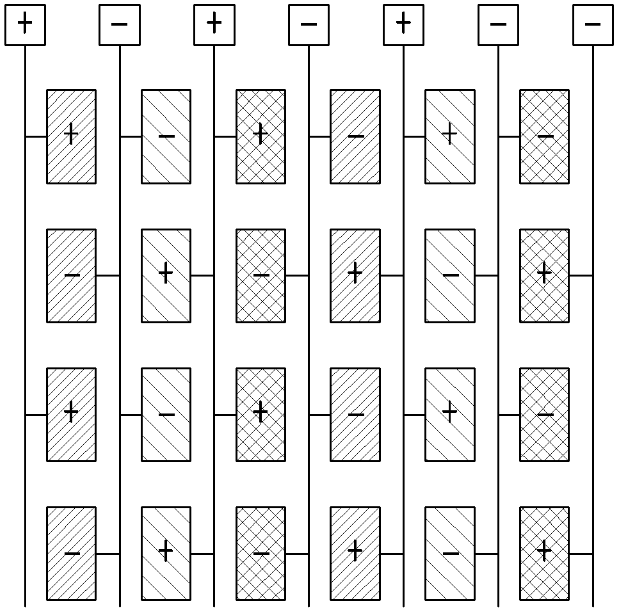
Figure 9:
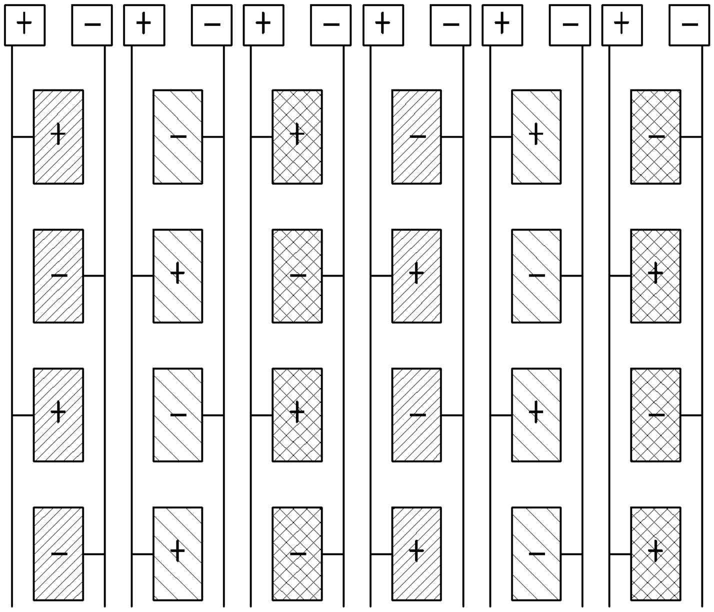

FIGS. 7, 8 and 9 are diagrams illustrating a method for driving a display panel according to various embodiments.

When two gate lines are simultaneously driven by the processor 120 according to an embodiment of the disclosure, pixels adjacent in upward and downward directions display the same color. That is, in order to display the same color of pixels adjacent in the vertical direction, the display panel 110 may be implemented as a panel having a 1 D1G stripe structure, as shown in FIG. 7. In this case, the gate terminals of the pixels adjacent in upward and downward directions are simultaneously turned on, and since the same data value is input, two pixels adjacent in upward and downward directions may display the same color. For example, the processor 120 may select two adjacent gate lines in the vertical direction and provide the same data to two gate lines through the plurality of data lines. For example, two pixels adjacent in a vertical direction among a plurality of pixels included in two pixel lines corresponding to two gate lines may be provided with the same data.

In the case of the panel of the 1 D1G crossed structure of FIG. 8 or the panel of 2DHG structure of FIG. 9, even if the first gate line and the second gate line are driven at the same time, since the data values input to the pixels adjacent in the vertical direction are different from each other, two adjacent pixels cannot display different colors, and thus various embodiments of the disclosure in which two adjacent pixel lines receive the same data cannot be applied. However, the disclosure is not limited thereto, and various embodiments of the disclosure may be applied as long as it is a technology capable of displaying the same color by simultaneously driving adjacent pixels in the vertical direction even in the case of a panel having a 1 D1G crossed structure or a panel having a 2 DHG structure.

Figure 10:
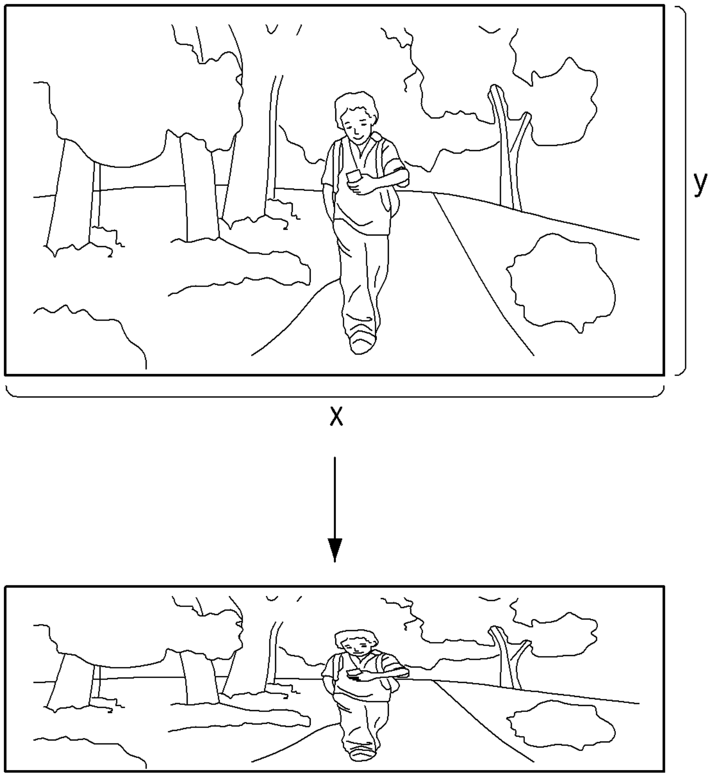
FIG. 10 is a diagram illustrating resolution according to various embodiments.

FIG. 10 is a diagram illustrating resolution according to various embodiments.

The content shown in the upper end of FIG. 10 may refer to a content of a first resolution, for example, x×y resolution, and the content shown at the lower end may refer, for example, to a content of a second resolution, for example, x×(y/2) resolution.

The processor 120 according to an embodiment of the disclosure may adjust the resolution of the content based on the division value of the vertical resolution of the display panel 110. For example, as shown in FIG. 10, when the display panel 110 is a panel having a resolution of 7680×4320, the processor 120 may adjust the resolution of the content to 7680×2160. FIG. 10 shows that the resolution of the received content corresponds to the resolution of the display panel 110 for convenience of description, but this is merely an example and is not limited thereto. For example, if the resolution of the received content does not correspond to the resolution of the display panel 110, the processor 120 may perform upscaling or downscaling to adjust the resolution of the received content to correspond to the division value of the vertical resolution of the display panel 110.

Figure 11:
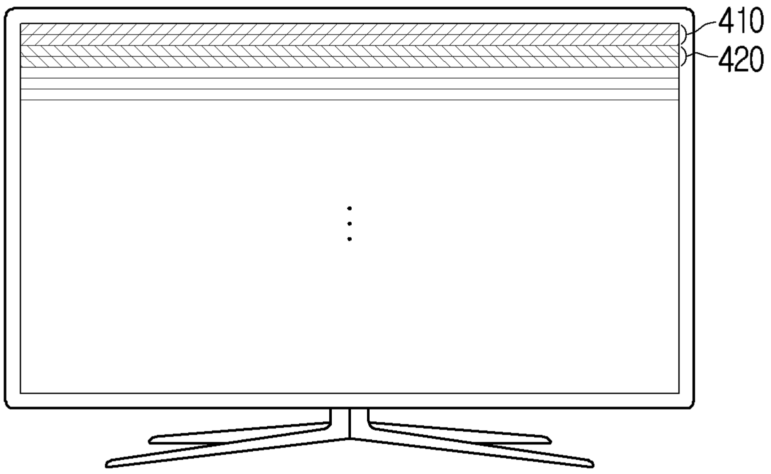
FIG. 11 is a diagram illustrating a pixel line according to various embodiments.

FIG. 11 is a diagram illustrating an example pixel line according to various embodiments. Referring to FIG. 11, the processor 120 may simultaneously drive two adjacent gate lines among a plurality of gate lines included in the display panel 110. For example, as shown in FIG. 11, the processor 120 may drive and display two adjacent gate lines 410 on a first row of content whose resolution is adjusted to 7680×2160. The processor 120 may drive and display two adjacent gate lines 420 of a second row of the content whose resolution is adjusted to 7680×2160.

Figure 12:
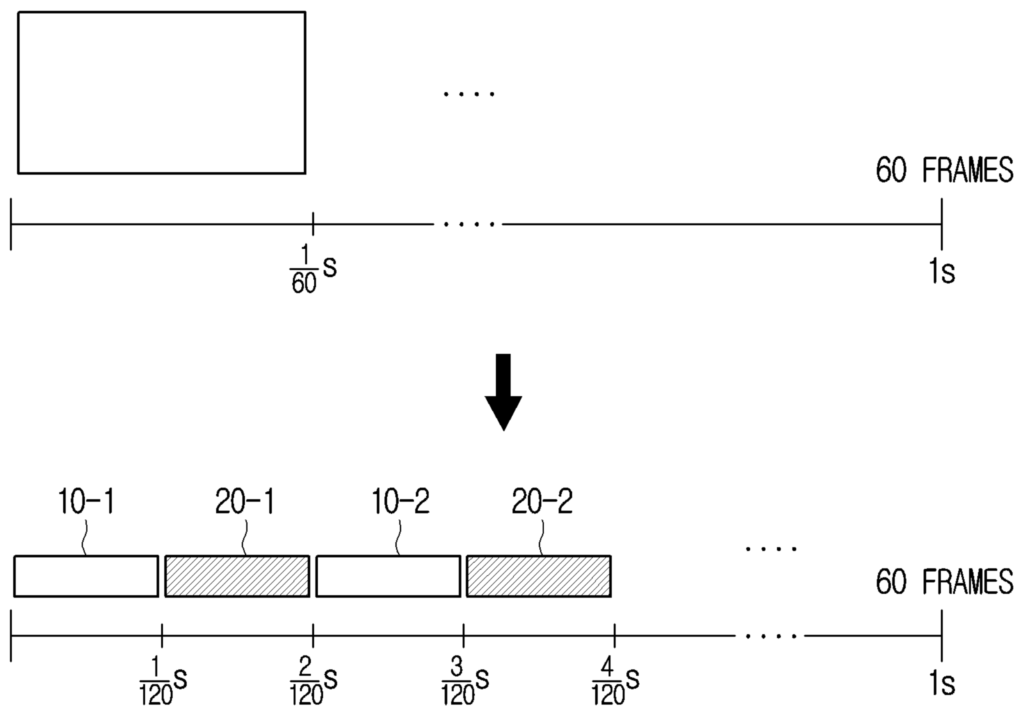
FIG. 12 is a diagram illustrating a first frame rate and a second frame rate according to various embodiments.

FIG. 12 is a diagram illustrating a first frame rate and a second frame rate according to various embodiments.

According to an embodiment, the processor 120 may shorten a time to display one frame into half.

When the processor 120 does not perform an operation as illustrated in FIGS. 10 and 11 according to an embodiment, as shown in the upper end of FIG. 12, one frame may be displayed for 1/60 s. When performing the operations of FIGS. 10 and 11, the processor 120 may display one frame for 1/120 s, as shown at the lower end of FIG. 12. That is, the processor 120 may display two frames for 1/60 s.

Consequently, the processor 120 may display 60 frames for one second in the case of the upper end of FIG. 12, but in the lower part of FIG. 12, 120 frames may be displayed for one second. That is, the processor 120 may maintain the driving speed of the gate line of the display panel 110 as it is and shorten the time for displaying one frame through the degradation of the vertical resolution, thereby providing the same effect as the frame rate being increased. In addition, an interpolated frame is generated between a plurality of frames of the content, and an interpolated frame is provided without omitting a frame, thereby minimizing and/or reducing a motion blur phenomenon. A detailed description thereof will be described below with reference to FIGS. 17 and 18.

Figure 13:
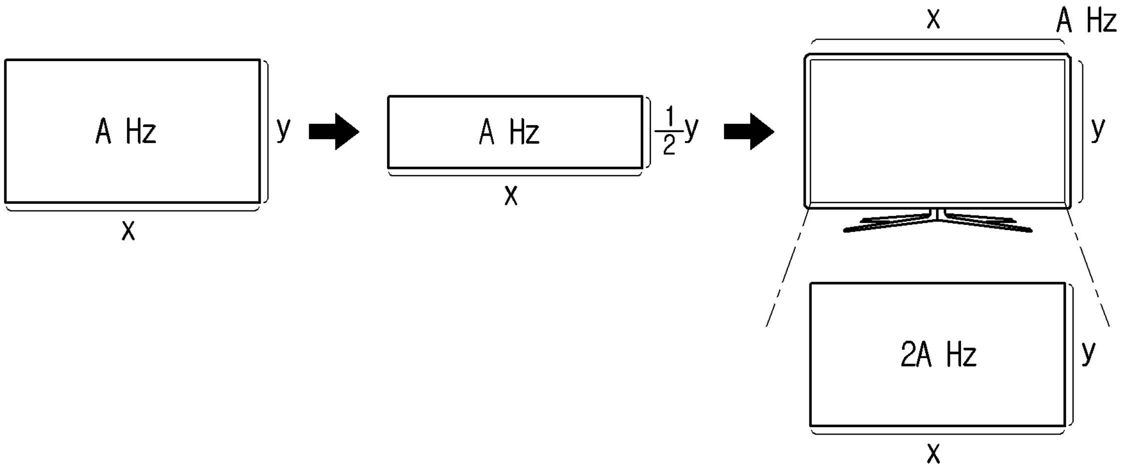
FIG. 13 is a diagram illustrating a method of adjusting resolution according to various embodiments.

FIG. 13 is a diagram illustrating an example method of adjusting resolution according to various embodiments.

Referring to FIG. 13, the display panel 110 is an A Hz panel of x×y resolution.

The processor 120 may adjust at least one of the horizontal resolution or the vertical resolution of the content based on the horizontal resolution of the display panel 110 and the division value of the vertical resolution.

For example, as shown in FIG. 13, the processor 120 may adjust the resolution of the content to x×y/2 if the resolution of the content is x×y and the frame rate is A Hz. Although FIG. 13 illustrates that the resolution of the content is the same as the resolution of the display panel 110 for convenience of description, this is merely an example and is not limited thereto. For example, if the resolution of the content is x/2×y/2 and the frame rate is A Hz, the processor 120 may upscale to adjust the resolution of the content to x×y/2.

Figure 14:
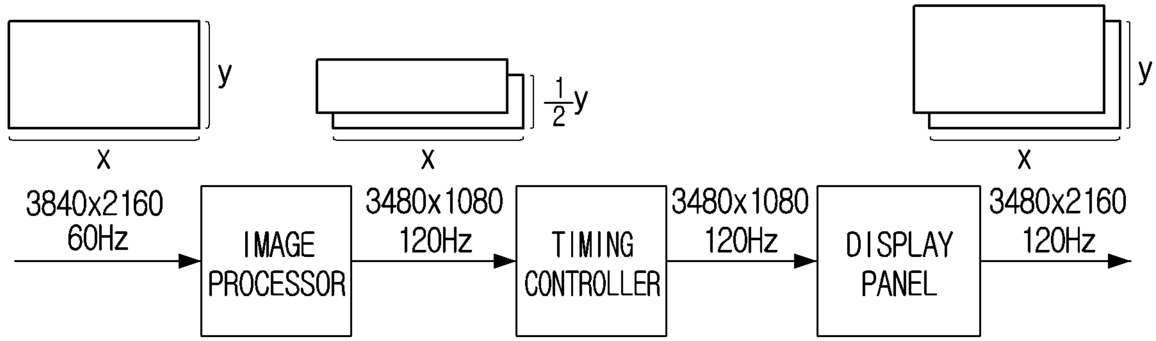
FIGS. 14, 15 and 16 are diagrams illustrating first resolution and second resolution according to various embodiments.
Figure 15:
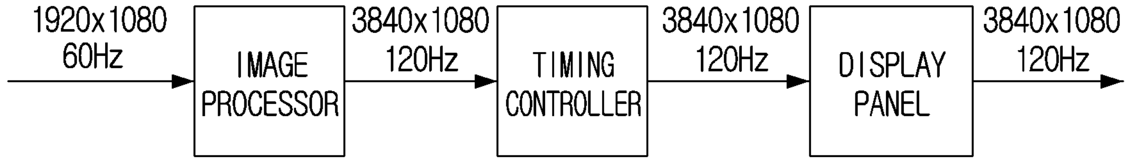
Figure 16:
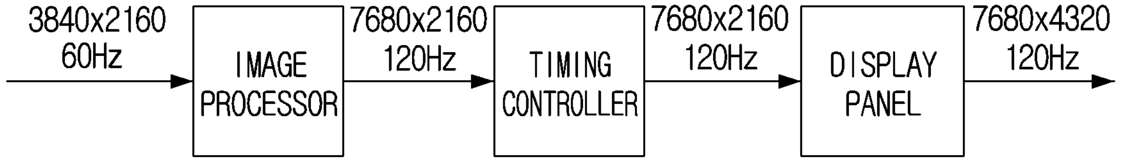

FIGS. 14, 15 and 16 are diagrams illustrating first resolution and second resolution according to various embodiments.

Referring to FIG. 14, the display panel 110 is a 60 Hz panel having a resolution of 3840×2160, and when the resolution of the content is 3840×2160 and the frame rate is 60 Hz, the processor 120 may adjust the resolution of the content to 3840×1080. The processor 120 may generate an interpolated frame based on a plurality of frames of the content. A frame rate of content comprising a plurality of frames and an interpolated frame may be 120 Hz.

The processor 120 may provide data corresponding to a first pixel line among 1080 pixel lines included in each of frames of the content having the resolution of 3840×1080, to a first pixel line positioned at the upper end of the display panel 110 and a second pixel line positioned adjacent to the first pixel line.

The processor 120 may provide data corresponding to a $1080^{th}$ pixel line among 1080 pixel lines included in each of the 1080 pixel lines included in each of the frames of the content having the resolution of 3840×1080, to the $2159^{th}$ pixel line and the $2160^{th}$ pixel line of the display panel 110.

Referring to FIG. 15, the display panel 110 is a 60 Hz panel of 3840×2160 resolution, and when the resolution of the content is 1920×1080 and the frame rate is 60 Hz, the processor 120 may adjust the resolution of the content to 3840×1080. The processor 120 may generate an interpolated frame based on a plurality of frames of the content. A frame rate of content comprising a plurality of frames and an interpolated frame may be 120 Hz. The processor 120 may provide data corresponding to a first pixel line among 1080 pixel lines included in each of frames of the content having the resolution of 3840×1080, to a first pixel line positioned at the upper end of the display panel 110 and a second pixel line positioned adjacent to the first pixel line. By repeating such an operation, the display panel 110 may display a resolution of 3840×2160 resolution and content of 120 Hz.

As another example, referring to FIG. 16, if the display panel 110 is a 60 Hz panel having 7680×4320 resolution, and when the resolution of the content is 3840×2160 and the frame rate is 60 Hz, the processor 120 may adjust the resolution of the content to 7680×2160. The processor 120 may generate an interpolated frame based on a plurality of frames of the content. A frame rate of a content of 7680×2160 resolution including a plurality of frames and an interpolated frame may be 120 Hz. The processor 120 may provide data corresponding to a first pixel line among 2160 pixel lines included in each of frames of the content of 7680×2160 resolution to a first pixel line positioned at an upper end of the display panel 110 and a second pixel line positioned adjacent to the first pixel line. By repeating the above operation, the display panel 110 may display 7680×4320 resolution and 120 Hz content.

The processor 120 according to an embodiment of the disclosure may adjust the resolution of the content and generate the interpolated frame by performing the operations illustrated in FIGS. 10 and 11. If the frame rate of the content including the interpolated frame is larger than the frame rate of the display panel 110, the related-art display apparatus makes a plurality of frames temporally following the specific frame before the display panel 110 displays a specific frame, so that some frames may be lost or omitted.

The processor 120 according to an embodiment of the disclosure may adjust the vertical resolution of the content including the interpolated frame, and may prevent and/or reduce a problem that some frames are lost or omitted by providing the same data to an adjacent pixel line. In addition, when a frame temporally following a specific frame is input while the display panel (110) displays a specific frame, the occurrence of screen tearing for displaying different frames at the upper and lower ends of the panel may be prevented and/or reduced.

The display apparatus 100 according to an embodiment of the disclosure may perform a vertical synchronization (V-sync) for setting the frame generation timing of the content and the frame output timing of the display panel 110 to be matched.

The processor 120 according to an embodiment of the disclosure may control the display panel 110 to output the content of the first resolution at the first frame rate when the display apparatus 100 operates in the first mode. As another example, when the display apparatus 100 operates in the second mode, the processor 120 may control the display panel 110 to output the content of the second resolution including the interpolated frame at a second frame rate greater than the first frame rate. When the display apparatus 100 operates in the first mode, the processor 120 may sequentially display only a plurality of frames of the content without generating an interpolated frame.

According to an embodiment of the disclosure, the processor 120 may receive a user input for controlling whether to change a frame rate of content. If the user input is an input for changing the frame rate, the processor 120 may operate the display apparatus 100 in the second mode. The processor 120 may adjust the resolution of the received content and generate and insert an interpolated frame into the content having the adjusted resolution. The processor 120 may output the content of the adjusted resolution including the interpolated frame at the changed frame rate.

The adjusted resolution may correspond to resolution that bisects the vertical resolution of the display panel 110, and the changed frame rate may correspond to twice the frame rate of the display panel 110. The first mode may be referred to as a normal mode and the second mode may be referred to as a high-speed mode, but is not limited to the name.

However, this is an example and the adjusted resolution corresponds to a resolution in which the vertical resolution of the display panel 110 is trisected, and the changed frame rate may correspond to three times the frame rate of the display panel 110. For example, the processor 120 may obtain the second content by adding two interpolated frames between a plurality of frames of the first content of 60 Hz. The processor 120 may adjust the resolution of the second content to correspond to the resolution obtained by trisecting the vertical resolution of the display panel 110. The processor 120 may provide the same data to three pixel lines adjacent to the display panel 110 to output second content of 180 Hz. As another example, the processor 120 may control the display panel 110 to output the second content of 240 Hz by adjusting the number of interpolated frames and the division value.

According to an embodiment of the disclosure, the processor 120 may identify whether to change the frame rate of the content based on the type of the received content or the metadata corresponding to the content, in addition to the user input, or whether to generate and output a new frame (for example, an interpolated frame) to the content.

For example, the processor 120 may identify whether to change a frame rate of the content based on at least one of content type or object information in the content. Here, the content type may indicate information on whether the content corresponds to any one of movie content, game content, streaming content, or image content. However, the content described above is merely an example, and is not limited thereto. For example, the type of content may be classified in greater detail. For example, the type of content may indicate information on which genre in game content the received content corresponds, among the game contents such as a rhythm game, a first person shooter (FPS) game, a battle game, and the like. As another example, the content type may indicate information on which genre of the movie content, the received content corresponds among the movie contents such as an action movie, a war movie, an science fiction (SF) movie, an animation, or the like.

When it is identified that the received content is FPS game content, the processor 120 according to an embodiment may generate an interpolated frame to minimize and/or reduce a delay time, a blurring area, and the like, and may add the interpolated frame between a plurality of frames of the content. The processor 120 may identify the type of the content and change the frame rate of the content at a frame rate corresponding to the identified type. For example, the FPS game content among the game contents may be preset to output at 120 Hz, and when it is identified that the type of the received content is FPS game content through analysis of metadata or content of the received content, the processor 120 may generate an interpolated frame and change the frame rate of the content to 120 Hz. However, this is merely an example, and a specific frame rate may be preset for each of a plurality of content genres, or a specific frame rate may be preset only for some content genres. For example, if a specific frame rate corresponding to the content genre of the received image is preset, the processor 120 may drive the panel 110 at the corresponding frame rate, and if the specific frame rate is not preset in the content genre corresponding to the received image, the processor 120 may drive the display panel 110 at a frame rate obtained based on metadata of the received image.

The processor 120 according to an embodiment may determine image processing delay information based on object information in an image.

As an example, the processor 120 may change the frame rate of the display panel 110 in order to smoothly provide an object to the user when an object greater than or equal to a threshold number is identified in the received image or when it is identified that the plurality of objects are changed in the image according to the object motion information. For example, the processor 120 may increase the frame rate of the display panel 110 and output the received image in order to provide a smooth image to the user without interruption or delay when the object in the frame included in the received image is rapidly changed or when the plurality of objects move. The object motion information may include information on a location change of each of objects included in a previous frame and a current frame.

For example, the processor 120 may change the frame rate of the display panel 110 to a threshold frame rate or more and output an image (or content) when the content in which the location of each of the plurality of objects is changed is identified when the frame is changed, such as shooting game content, sports game content, and the like. Here, the threshold frame rate may refer to a frame rate for providing game content, movie content, and the like to a user without delay. For example, the critical frame rate may be set to 120 Hz, but is not limited thereto.

Figure 17:
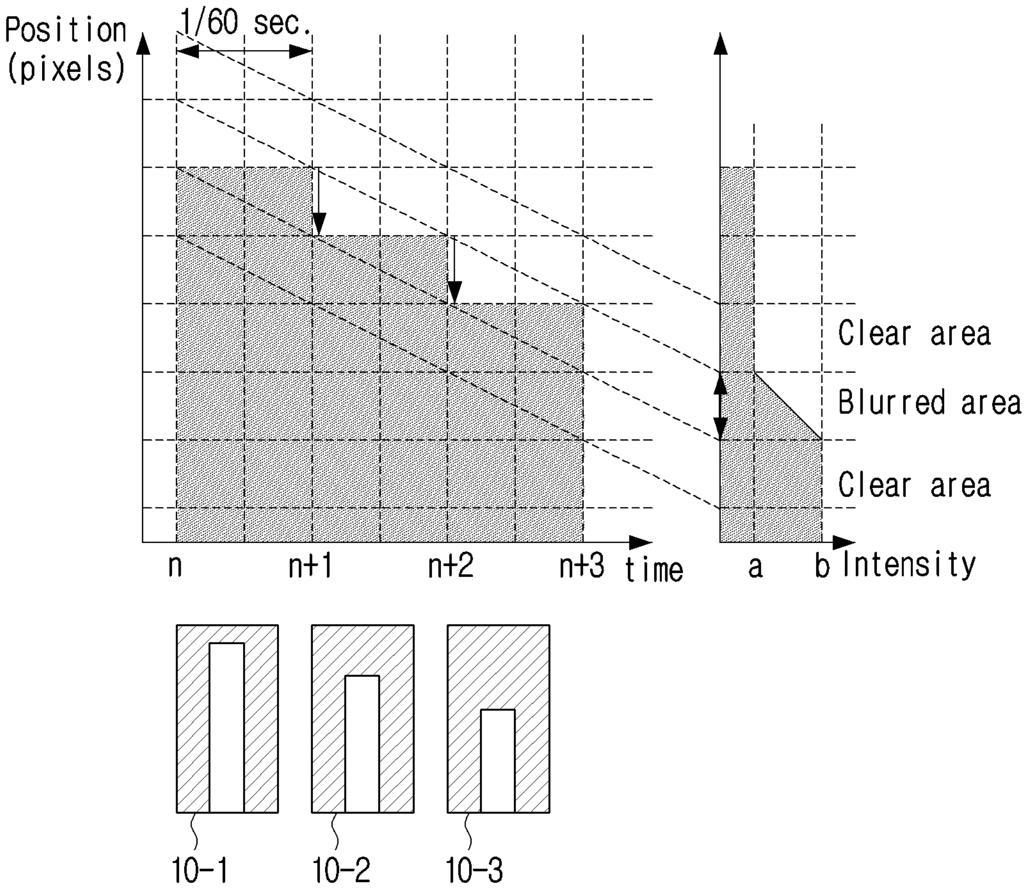
FIGS. 17 and 18 are diagrams illustrating a blurring area according to various embodiments.
Figure 18:
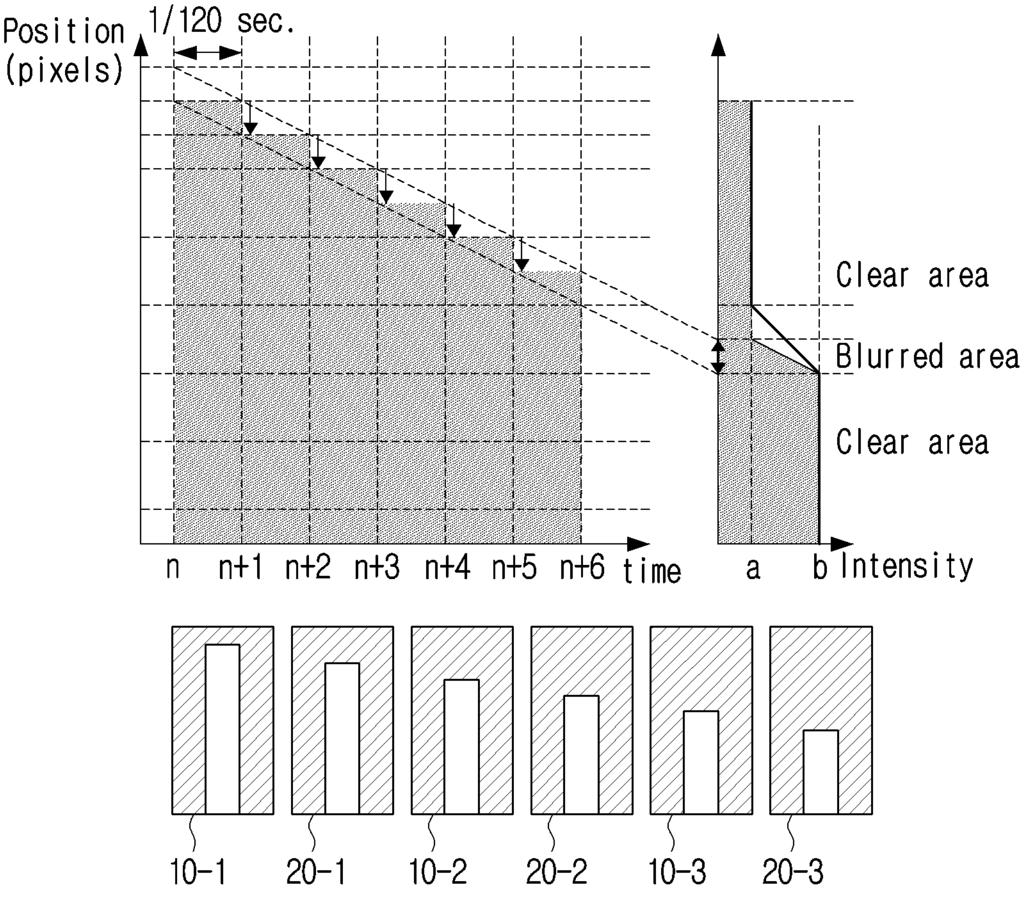

FIGS. 17 and 18 are diagrams illustrating an example blurring area according to various embodiments.

FIG. 17 illustrates an example where an object included in each of a first frame 10-1, a second frame 10-2 to a third frame 10-3 among a plurality of frames of the received content changes a position, a shape, and the like, over time.

A related-art display apparatus or the display apparatus 100 operating in a first mode according to an embodiment of the disclosure may display a first frame 10-1 for a first time corresponding to a first frame rate when the received content is a first frame rate, and display a second frame rate 10-2 for a first time corresponding to the first frame rate. For example, the display apparatus 100 may display each of a plurality of frames of content of 60 Hz for 1/60 s. In this example, a blurring area is generated due to a response speed of the display panel, an afterimage effect by the eyes of the user, and the like. For example, when the second frame 10-2 is provided through the display panel 110, the position and shape of the object included in the first frame temporally preceding may overlap the position and shape of the object included in the second frame 10-2 due to the eye characteristics of the user.

Referring to FIG. 18, the processor 120 according to an embodiment of the disclosure may generate an interpolated frame between a plurality of frames of content. For example, the processor 120 may generate a first interpolated frame 20-1 between the first frame 10-1 and the second frame 10-2. The processor 120 may generate a second interpolated frame 20-2 between the second frame 10-2 and the third frame 10-3, and may generate a third interpolated frame 20-3 after the third frame 10-3. The interpolated frame may be a frame for reducing motion judder and minimizing and/or reducing blurring areas. Referring to FIG. 18, the processor 120 may generate the first interpolated frame 20-1 including an object according to a predicted motion by predicting a motion of an object due to a path difference of a vector based on a shape and a position of an object included in each of the first frame 10-1 and the second frame 10-2.

Comparing the graph shown in FIGS. 17 and 18, the blurring area felt by the user may decrease due to the interpolated frame. In addition, the motion of objects in the content may be clearly and smoothly improved due to the interpolated frame.

Figure 19:
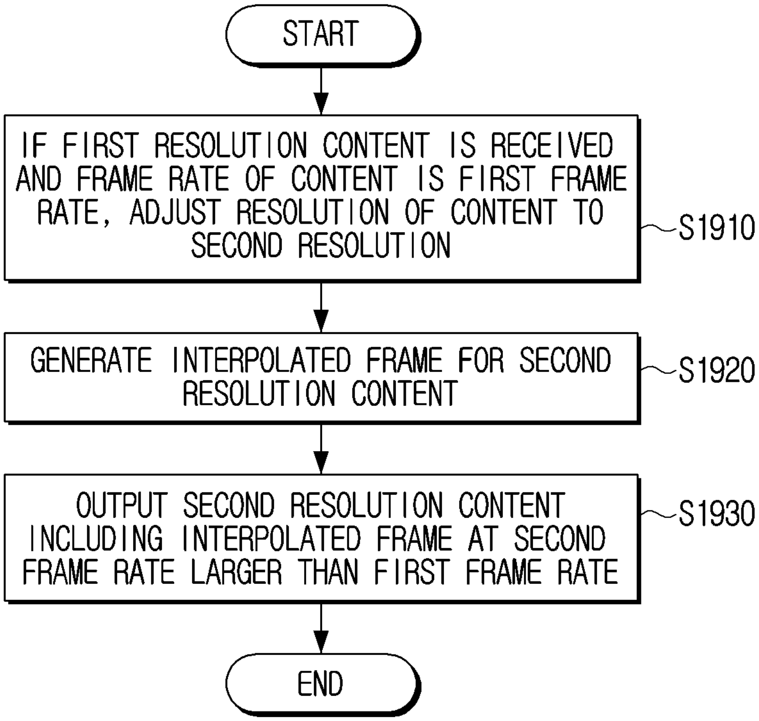
FIG. 19 is a flowchart illustrating an example method of controlling a display apparatus according to various embodiments.

FIG. 19 is a flowchart illustrating an example a method of controlling a display apparatus according to various embodiments.

Referring to FIG. 19, in a method for controlling a display apparatus including a display panel capable of outputting content of a first resolution at a first frame rate, first, content of a first resolution is received, and if the frame rate of the received content is a first frame rate, the resolution of the received content is adjusted to a second resolution in operation S1910. An interpolated frame for the content of the second resolution is generated in operation S1920. The display panel is controlled to output the content of the second resolution including the interpolated frame at a second frame rate greater than the first frame in operation S1930.

The display panel includes a plurality of pixel lines, and in operation S1930 of controlling the display panel, the display panel is controlled to provide the same data to at least two adjacent pixel lines among the plurality of pixel lines to output second resolution content including the interpolated frame at a second frame rate.

The number of a plurality of pixel lines may correspond to the number of pixels arranged vertically among a plurality of pixels included in a display panel.

The display panel includes a plurality of gate lines, a plurality of data lines, and a timing controller. The operation S1930 of controlling the display panel according to an embodiment of the disclosure may include selecting two adjacent gate lines among the plurality of gate lines and controlling the timing controller to provide the same data to the two gate lines through the plurality of data lines.

The horizontal resolution of the second resolution is the same as the horizontal resolution of the first resolution, and the vertical resolution of the second resolution may correspond to the bisector value of the vertical resolution of the first resolution.

The first frame rate may correspond to a bisector value of the second frame rate.

The operation S1930 of controlling the display panel according to an embodiment of the disclosure may include controlling the display panel to output the content of the first resolution at a first frame rate when the display apparatus operates in the first mode; and controlling the display panel to output the content of the second resolution including the interpolated frame at a second frame rate greater than the first frame rate when the display apparatus operates in the second mode.

The operation S1930 of controlling the display panel may include operating the display apparatus in one of the first mode or the second mode based on the user input.

The operation S1930 of controlling the display panel according to an embodiment of the disclosure may include operating the display apparatus in a first mode if the content is a first type; and operating the display apparatus in a second mode if the content is a second type.

The operation S1920 of generating an interpolated frame according to an embodiment of the disclosure may include generating an interpolated frame based on motion information of an object included in each of at least two temporally consecutive frames among a plurality of frames of the content of the second resolution.

Figure 20:
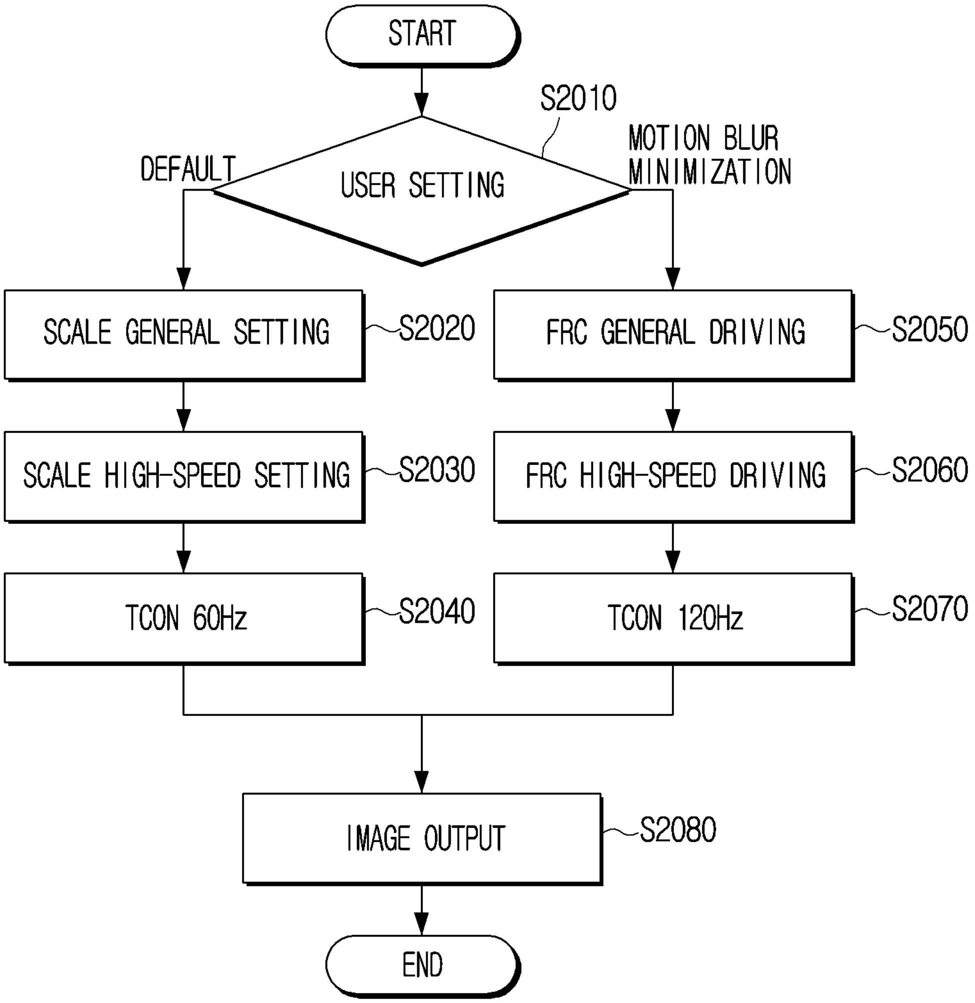
FIG. 20 is a flowchart illustrating an example method of user setting according to various embodiments.

FIG. 20 is a flowchart illustrating an example method of user setting according to various embodiments.

Referring to FIG. 20, first, when a user setting is input, a mode may be identified based on a user setting in operation S2010. For example, the display apparatus 100 may be set in a default mode, a basic mode, and a first mode according to a user setting in operation S2010: Default. Since the scale is set to a general value, the resolution may be maintained without adjusting the content of the first resolution to the second resolution in operation S2020.

As the FRC unit is driven at a general mode, the FRC unit may not generate an interpolated frame in operation S2030. Therefore, the frame rate of the content of the first frame rate may not be changed.

The timing controller TCON may be driven at a first frame rate (e.g., 60 Hz) in operation S2040. The display apparatus 100 may output the content of the first resolution and the content of the first frame rate at a first frame rate in operation S2080.

As another example, the display apparatus 100 may be set in a motion blur minimization/reduction mode or a second mode according to a user setting. Since the scale is set at high speed according to an embodiment, the content of the first resolution may be adjusted to the second resolution in operation S2050.

As the FRC unit is driven in the high speed mode, the FRC unit may generate an interpolated frame in operation S2060. Thus, it may be changed to a second frame rate of the content of the first frame rate.

The TCON may be driven at a second frame rate (e.g., 120 Hz) in operation S2070. The display apparatus 100 may output the content of the second resolution and the content of the second frame rate at a second frame rate in operation S2080.

However, various embodiments of the disclosure may be applied not only to a display apparatus, but also to all electronic devices capable of image processing such as an image reception device such as a set-top box, an image processing device, and the like.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. Each of the software modules may perform one or more of the functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the acoustic output device 100 according to the various embodiments described above when executed by the processor of the particular device.

The non-transitory computer-readable medium semi-permanently stores data and is available of reading by the device. For example, the non-transitory computer-readable medium may be CD, DVD, a hard disc, Blu-ray disc, USB, a memory card, ROM, or the like.

While various example embodiments of the disclosure have been illustrated and described, the disclosure is not limited to the aforementioned specific embodiments, and it is apparent that various modifications may be made by those having ordinary skill in the technical field to which the disclosure belongs, without departing from the gist of the disclosure including as claimed by the appended claims. Also, it is intended that such modifications are not to be interpreted independently from the technical idea or prospect of the disclosure.

What is claimed is:

1. A display apparatus comprising:

a display panel comprising a plurality of gate lines and a plurality of data lines and capable of outputting content having a first resolution at a first frame rate by sequentially, during a first frame time, driving each respective gate line while providing respective data to each data line;

a communication interface comprising communication circuitry; and a processor, comprising processing circuitry, configured to:

based on first content having the first resolution being received through the communication interface and a frame rate of the first content being the first frame rate;

generate interpolated frames based on temporally consecutive frames of the first content, obtain second content comprising the interpolated frames and frames corresponding to frames of the first content, the second content having a second frame rate n times greater than the first frame rate and a second resolution n times lower than the first resolution, where n is an integer equal to or greater than 2, wherein the second content having the second frame rate is obtained by sequentially, during a second frame time which is n times less than the first frame time, driving n respective gate lines concurrently while providing a same data to each data line within respective groups of n adjacent data lines, and display the second content.

2. The display apparatus of claim 1, wherein a number of the plurality of data lines corresponds to a number of pixels arranged in a vertical direction among a plurality of pixels included in the display panel.

3. The display apparatus of claim 1, wherein horizontal resolution of the second resolution is the same as horizontal resolution of the first resolution, and wherein vertical resolution of the second resolution corresponds to one-half of vertical resolution of the first resolution.

4. The display apparatus of claim 1, wherein the first frame rate corresponds to one-half of the second frame rate.

5. The display apparatus of claim 1, wherein the processor is further configured to:

based on the display apparatus being driven in a first mode, control the display panel to output the first content at the first frame rate, and based on the display apparatus being driven in a second mode, control the display panel to output the second content at the second frame rate.

6. The display apparatus of claim 5, wherein the processor is configured to operate the display apparatus in any one of the first mode or the second mode based on receiving an input.

7. The display apparatus of claim 5, wherein the processor is further configured to:

based on the content being a first type, operate the display apparatus in the first mode, and based on the content being a second type, operate the display apparatus in the second mode.

8. The display apparatus of claim 1, wherein the processor is further configured to generate the interpolated frames based on motion information of objects included in each of at least two temporally consecutive frames.

9. The display apparatus of claim 1, wherein the processor comprises:

a frame rate conversion (FRC) unit comprising frame rate conversion circuitry, wherein the FRC unit is configured to generate the content of the second frame rate and the second resolution including the interpolated frames by generating the interpolated frames with respect to the content of the first frame rate and the second resolution.

10. A method of controlling a display apparatus comprising a display panel comprising a plurality of gate lines and a plurality of data lines and capable of outputting content having a first resolution at a first frame rate by sequentially, during a first frame time, driving each respective gate line while providing respective data to each data line, the method comprising:

receiving first content having the first resolution;

based on a frame rate of the first content being the first frame rate;

generating interpolated frames based on temporally consecutive frames of the first content;

obtaining second content comprising the interpolated frames and frames corresponding to frames of the first content, the second content having a second frame rate n times greater than the first frame rate and a second resolution n times lower than the first resolution, where n is an integer equal to or greater than 2, wherein the second content having the second frame rate is obtained by sequentially, during a second frame time which is n times less than first frame time, driving n respective gate lines concurrently while providing a same data to each data line within respective groups of n adjacent lines; and displaying the second content.

11. The method of claim 10, wherein a number of the plurality of data lines corresponds to a number of pixels arranged in a vertical direction among a plurality of pixels included in the display panel.

12. The method of claim 10, wherein horizontal resolution of the second resolution is the same as horizontal resolution of the first resolution, and wherein vertical resolution of the second resolution corresponds to one-half of vertical resolution of the first resolution.

13. The method of claim 10, wherein the first frame rate corresponds to one-half of the second frame rate.

14. The method of claim 10, further comprising, based on the display apparatus being driven in a first mode, controlling the display panel to output the first content at the first frame rate, and, based on the display apparatus being driven in a second mode, controlling the display panel to output the second content at the second frame rate.

15. The method of claim 14, further comprising operating the display apparatus in any one of the first mode or the second mode based on receiving an input.

16. A non-transitory computer readable recording medium including a program that, when executed by at least one processor of a display apparatus comprising a display including a plurality of rows of pixels and capable of outputting content having a first resolution at a first frame rate by sequentially, during a first frame time, driving each respective gate line while providing respective data to each data line, causes the display apparatus to perform operations comprising:

receiving first content having the first resolution;

based on a frame rate of the first content being the first frame rate:

generating interpolated frames based on temporally consecutive frames of the first content; and obtaining second content comprising the interpolated frames and frames corresponding to frames of the first content, the second content having a second frame rate n times greater than the first frame rate and a second resolution n times lower than the first resolution, where n is an integer greater than or equal to 2, wherein the second content is obtained by sequentially, during a second frame time which is n times less than the first frame time, driving n gate lines concurrently while providing a same data to each data line within respective groups of n adjacent data lines.

* * * * *